G. McCADDEN.
PACKING.
APPLICATION FILED FEB. 16, 1914.

1,139,306.

Patented May 11, 1915.

WITNESSES

INVENTOR
George McCadden
BY
ATTORNEYS

UNITED STATES PATENT OFFICE.

GEORGE McCADDEN, OF ST. CLOUD, MINNESOTA.

PACKING.

1,139,306.

Specification of Letters Patent.   Patented May 11, 1915.

Application filed February 16, 1914.   Serial No. 818,915.

*To all whom it may concern:*

Be it known that I, GEORGE MCCADDEN, a citizen of the United States, and a resident of St. Cloud, in the county of Stearns and State of Minnesota, have invented a new and Improved Packing, of which the following is a full, clear, and exact description.

The object of the invention is to provide a new and improved packing for use on pistons and other devices and arranged to prevent leakage of the motive agent past the packing from one end of the cylinder to the other end thereof.

In order to accomplish the desired result, use is made of a split inner or expanding ring and an expanding split outer or bearing ring, the outer and inner peripheries of the said rings being concentric and the joint between the rings being eccentric, each ring having at its thinnest portion a lap joint, the lap joints of the two rings being approximately diametrically opposite to each other. Use is also made of one or more retaining pins held in one of the rings and loosely engaging the other ring.

A practical embodiment of the invention is represented in the accompanying drawings forming a part of this specification, in which similar characters of reference indicate corresponding parts in both views.

Figure 1:
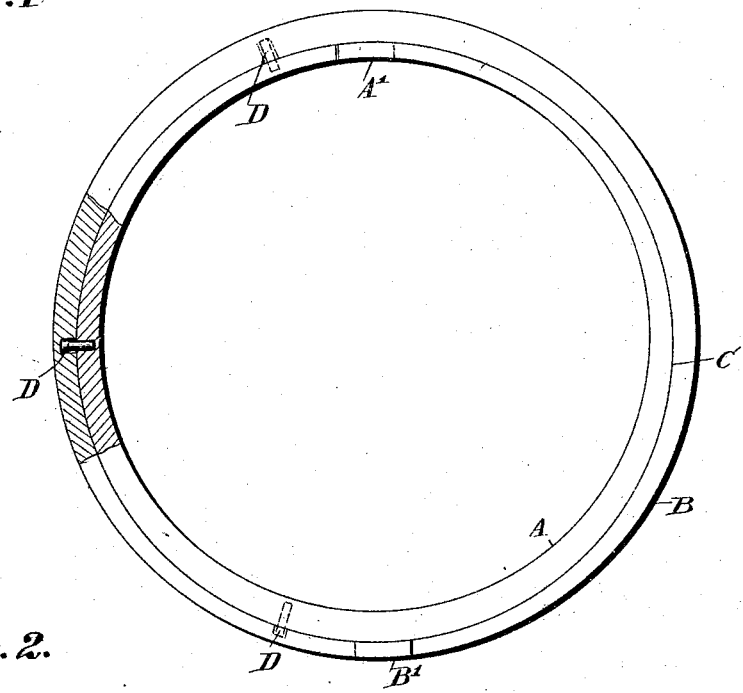
Figure 2:
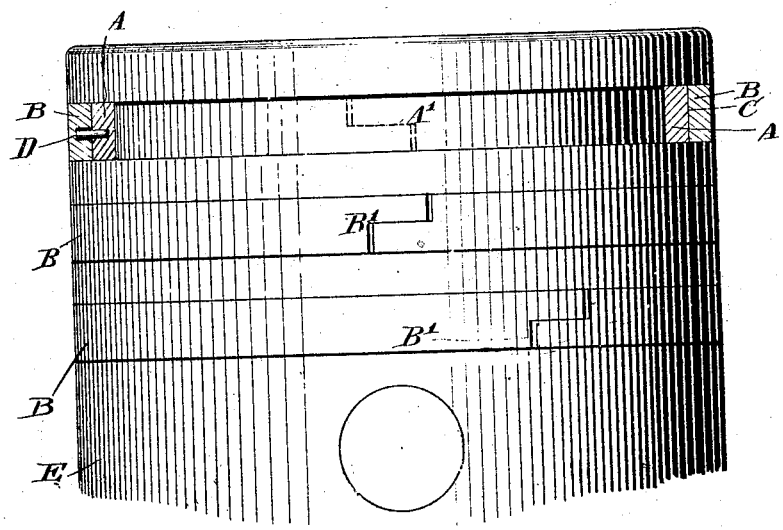

Figure 1 is a plan view of the packing with parts shown in section; and Fig. 2 is a side elevation of a piston provided with my improved packings, one of the packings being shown in section.

The packing consists essentially of an inner or expanding ring A and an expanding outer or bearing ring B, one overlying the other, and the outer and inner peripheries of the rings A and B being concentric while the joint C between the rings A and B is eccentric, as plainly shown in Fig. 1. The expanding ring A is provided at its thinnest portion with a lap or rabbet joint or miter or plain joint A', and a similar lap or rabbet joint B' (but not a miter or plain joint) is arranged at the thinnest portion of the outer or bearing ring B, the joints A' and B' being preferably arranged diametrically opposite each other, as shown in Fig. 1. Each of the joints A', B', is formed by providing the ends of each ring A or B at opposite sides with rabbets, each having a depth corresponding to one-half the width of the ring, and of a length preferably the same as or somewhat in excess of the width of the ring, as will be readily understood by reference to Fig. 2. By constructing the joint of each ring in the manner described gas is prevented from leaking across the joint and any gas that passes down the joint B' encounters the unbroken surface of the thick portion of the inner ring A and is thus checked or retarded and is hence not liable to leak past the packing. It will also be noticed that by arranging the joints A' and B', as shown and described, the efficiency of the joints is not affected by wear of the rings.

In order to hold the rings A and B against creeping or lateral movement one relatively to the other, use is made of one or a series of retaining pins D, each preferably attached to the expanding ring A and extending radially therefrom and loosely engaging a recess formed in the inner face of the outer or bearing ring B. It will be noticed that by this arrangement the retaining pin D does not project to the outer peripheral face of the outer or bearing ring B or the inner face of the inner ring A, and hence the pin is not liable to work out or come in contact with the inner surfaces of the cylinder in which reciprocates the piston E provided with the packing, as shown in Fig. 2. In case a pin becomes loose it is not liable to fall out and drop into the ring groove. When using a series of retaining pins D, as shown in Fig. 1, such pins are located in less than one-half portion of each ring, so that the other half portion is free to expand and contract as the case may be.

By providing the lap or rabbet joints A' and B' on both rings A and B and locating the same diametrically opposite each other, it is evident that the motive agent under pressure is not liable to leak past the packing.

As shown in section in Fig. 2 both rings A and B are the same thickness at their upper and lower edges: that is, the upper and lower edges are at right angles to the inner and outer faces.

Having thus described my invention, I claim as new and desire to secure by Letters Patent:

1. A piston packing comprising an inner expanding ring and an outer expanding bearing ring, the inner and outer peripheries of the rings being concentric and the joint between the rings being eccentric, each ring having at its thinnest portion a lap joint, said lap joints being located diametrically opposite each other, a retaining pin rigidly secured to the inner ring and projecting radially from the outer face thereof, the outer ring having a radial socket extending outwardly and partly through said ring whereby the radial pin may loosely engage the socket to prevent circumferential movement of the rings and provide a smooth outer surface for the outer ring over said socket.

2. A piston packing comprising an inner expanding and an outer expanding bearing ring, the inner and outer peripheries of the rings being concentric and the joint between the rings being eccentric, each ring having at its thinnest portion a lap joint, the said joints being wholly unobstructed and approximately diametrically opposite each other, a series of spaced retaining pins projecting radially from the outer face of the inner ring and rigidly secured to said ring, and radial recesses in the inner face of the outer ring at a suitable distance from its lapped ends, the said retaining pins being located in less than one half portion of its ring and of less length than the combined thickness of the inner and outer rings whereby said pins loosely engage said radial recesses and a smooth outer face on the outer ring over said pins is provided.

In testimony whereof I have signed my name to this specification in the presence of two subscribing witnesses.

GEORGE McCADDEN.

Witnesses:
 HENRY H. SULLIVAN,
 M. A. DOERNER.